Oct. 21, 1924.

H. DURLACH 1,512,585

FILE CUTTING MACHINE

Filed July 27, 1921

Witnesses:

Inventor:

Oct. 21, 1924.  
H. DURLACH  
1,512,585  
FILE CUTTING MACHINE  
Filed July 27, 1921   8 Sheets-Sheet 7

Witnesses:

Inventor:
Henri Durlach

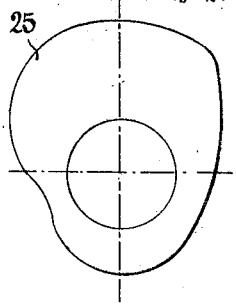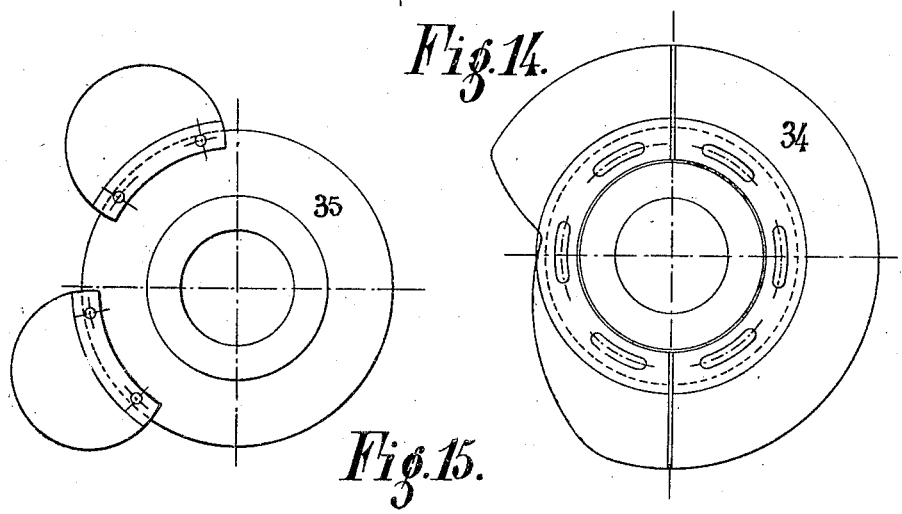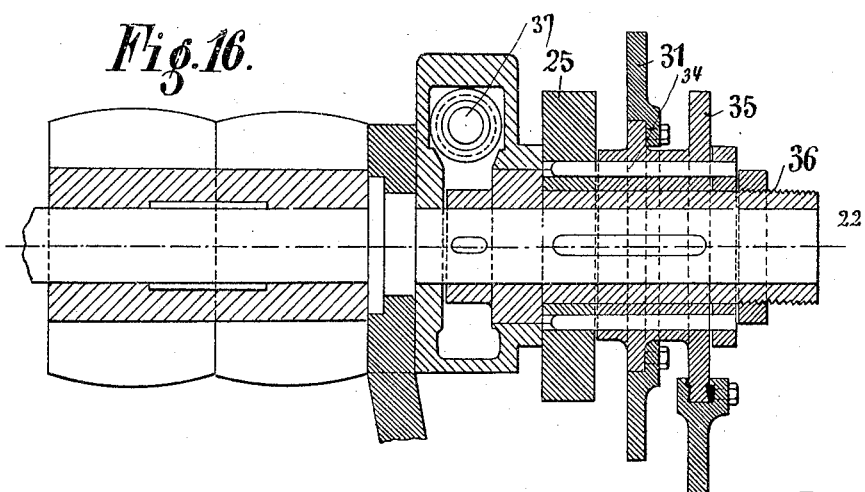

Patented Oct. 21, 1924.

1,512,585

UNITED STATES PATENT OFFICE.

HENRI DURLACH, OF PARIS, FRANCE, ASSIGNOR TO FORGES & ATELIERS DE CONSTRUCTIONS ELECTRIQUES DE JEUMONT, OF PARIS, FRANCE, A FRENCH JOINT-STOCK COMPANY.

FILE-CUTTING MACHINE.

Application filed July 27, 1921. Serial No. 487,822.

*To all whom it may concern:*

Be it known that I, HENRI DURLACH, a citizen of the French Republic, residing in Paris, France, have invented certain new and useful Improvements in File-Cutting Machines, of which the following is a specification.

This patent relates to an entirely automatic machine for cutting files and rasps of any dimensions and sizes.

In the machine according to this invention, the attendant seated in front of the machine can easily watch the work of the chisel, and his movements are reduced to a minimum, a file blank being merely put in the machine which cuts it and replaces it by a fresh one as soon as the cutting is done. All the movements—the rise and descent of the carriage, the rise and descent of the chisel, the inclination of the same according to the shape or kind of file cut, etc.—being controlled by templates which suit the files to be cut, the said templates, once they are placed in position on the machine, controlling the travel of the carriage and the inclination of the chisel, etc., automatically. The machine effects very quick, continuous work of excellent quality, equal to hand work owing to the position which the chisel can take relatively to the file.

The parts which control the force of the hammer blow, the total stoppage of the machine or of the carriage, etc., are within reach of the attendant who can operate them either by hand or with his foot.

A construction of the machine according to this invention is illustrated by way of example in the accompanying drawings, in which—

Figure 9:
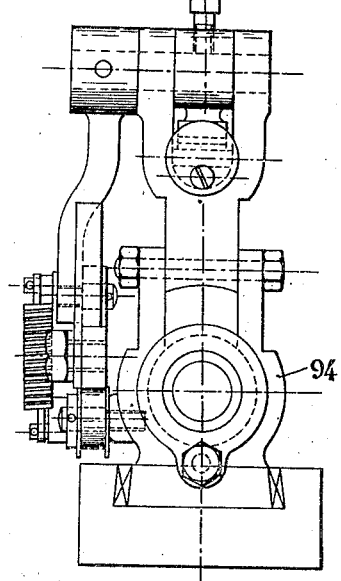
Figure 7:
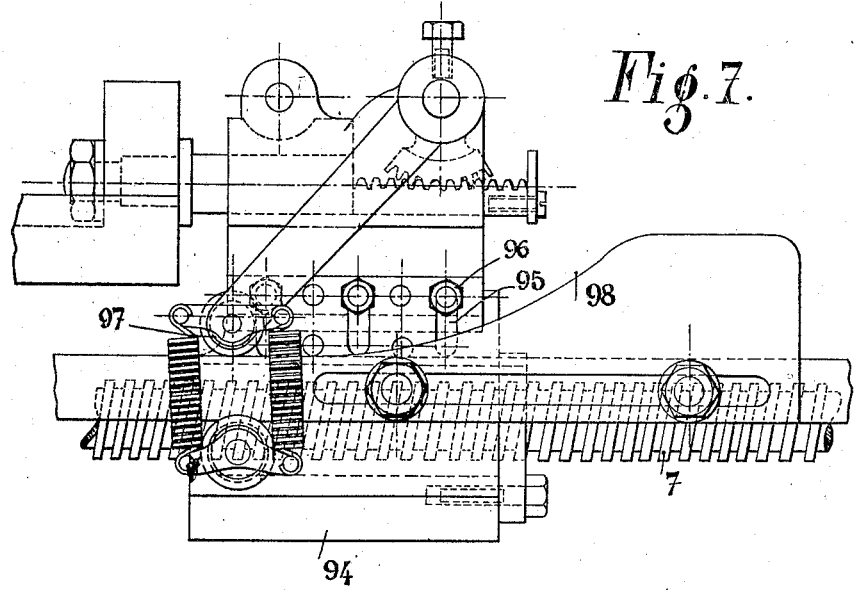
Figure 8:
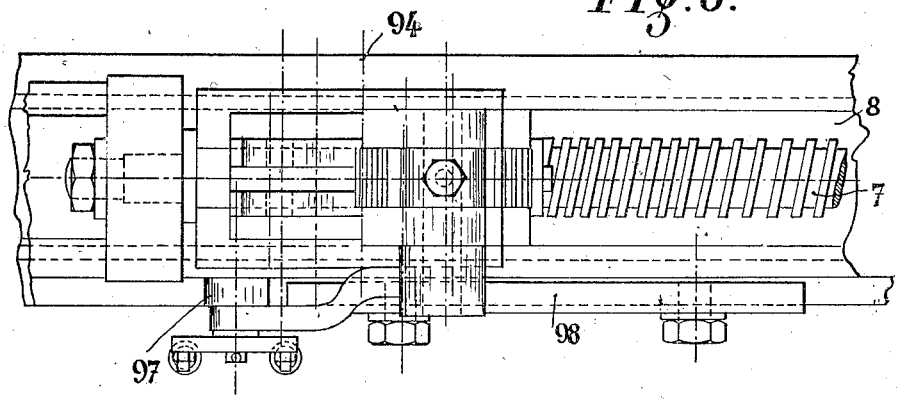

Figures 7—9 are respectively front elevation, plan and end elevation of the variable level driving device and guide.

Figure 10:
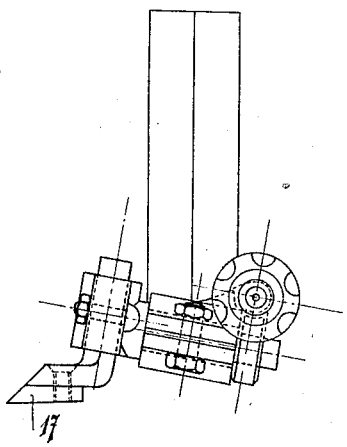
Figure 11:
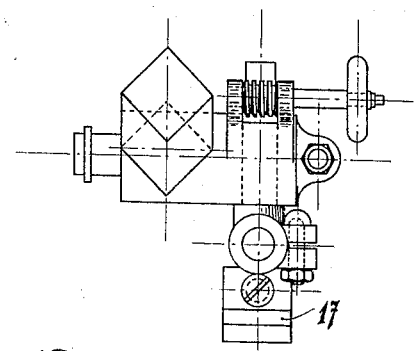

Figure 10 is an elevation of the guide on an enlarged scale,

Figure 11 a plan of the same.

Figure 12:
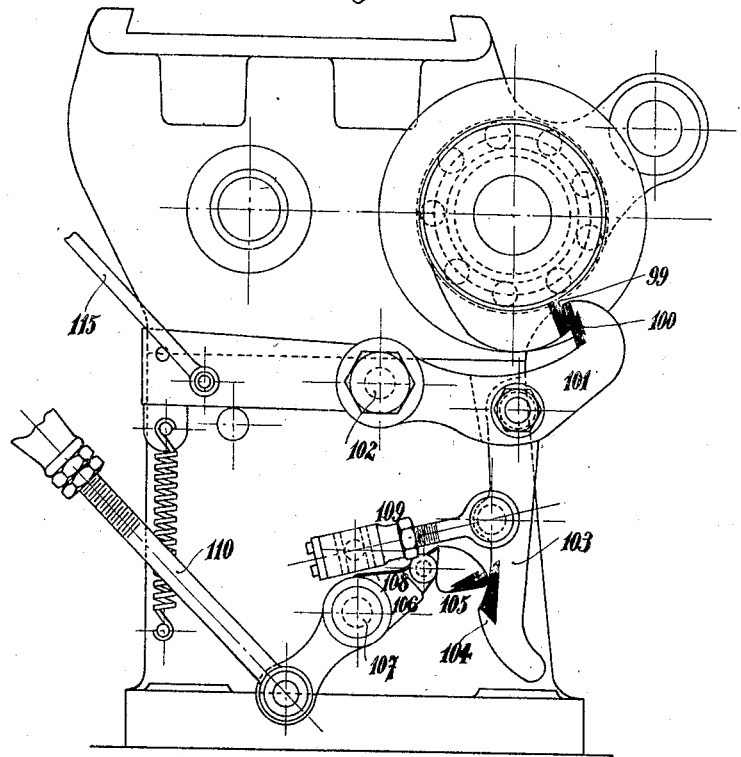

Figure 12 is a detail view of the release device,

Figure 13 a plan of the head template,

Figure 14 a plan of the cutting template,

Figure 15 a plan of the automatic movement template,

Figure 16 shows in detail the method of mounting the said three templates on the shaft driving the head.

This machine comprises a foundation plate 1 supporting the solid base 2 receiving the repeated shocks of cutting.

3 is a column bolted to the plate and carrying above the machine the device which by means of gear wheels 4 and satellite pinions 5 and 6, brings about the advance or feed of the carriage supporting the blanks to be cut.

This column also supports the shafts and parts for operating the templates regulating the various movements of the carriage, chisel and holder.

7 is a worm with square double thread (with a pitch of 25 mm. in order to facilitate the calculations for feeding) which ensures the feed of the carriage in a perfectly uniform manner. This worm is supported between a tempered point and a tempered step bearing.

8 is the carriage carrying the blanks to be cut, sliding in two cradles supporting and guiding the said carriage.

The feed mechanism of the carriage constituted by the satellite pinions 5 and 6, the worm 7, is supported at one of its ends by a small column 9 sliding on a small frame 10 inclined at the same angle as the carriage.

Figure 5:
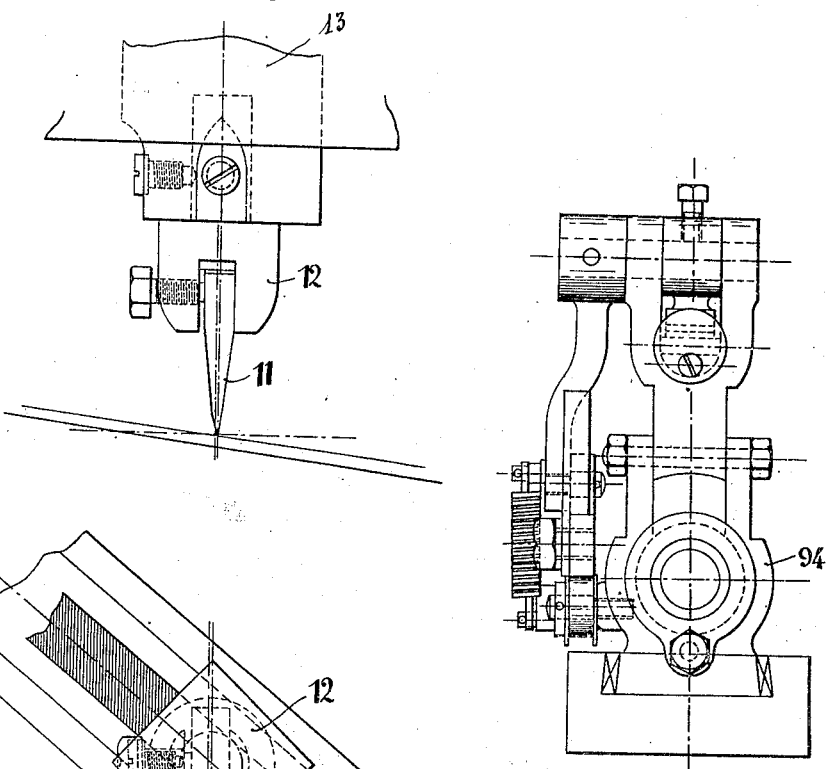
Figure 5 is an elevation, on an enlarged scale of the chisel holder.
Figure 6:
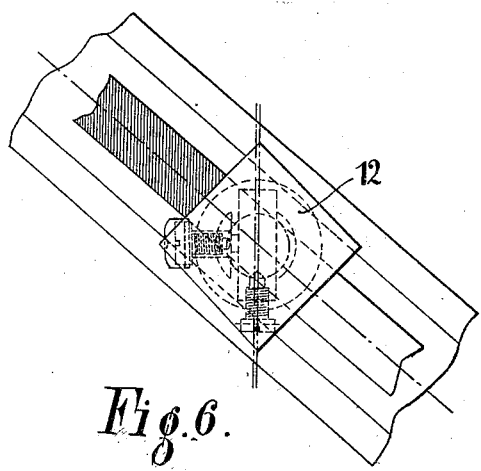
Figure 6 is a plan view of the same.

11 is the straight chisel intended for cutting files. This chisel is straight, that is to say its cutting edge is at right angles to its sides which in their turn are parallel to each other. This chisel is mounted (see Figures 5 and 6) in a chisel holder 12 which is arranged at the base of the hammer 13 in a cylindrical seat. The hammer 13 of cast steel is guided throughout its travel by guides with means for taking up shake in every direction, said means being formed of bronze or cast iron and forming part of the movable head. This hammer is controlled by a cam 14 which turns in bronze bearings mounted on a balance beam 15 which is attached to the guide 17 by means of an adjustable rod 16. A spring 18 arranged above the hammer and co-operating with the cam 14, determines and regulates the force of fall of the hammer 13 in accordance with the shape and depth of the tooth to be cut.

Figure 3:
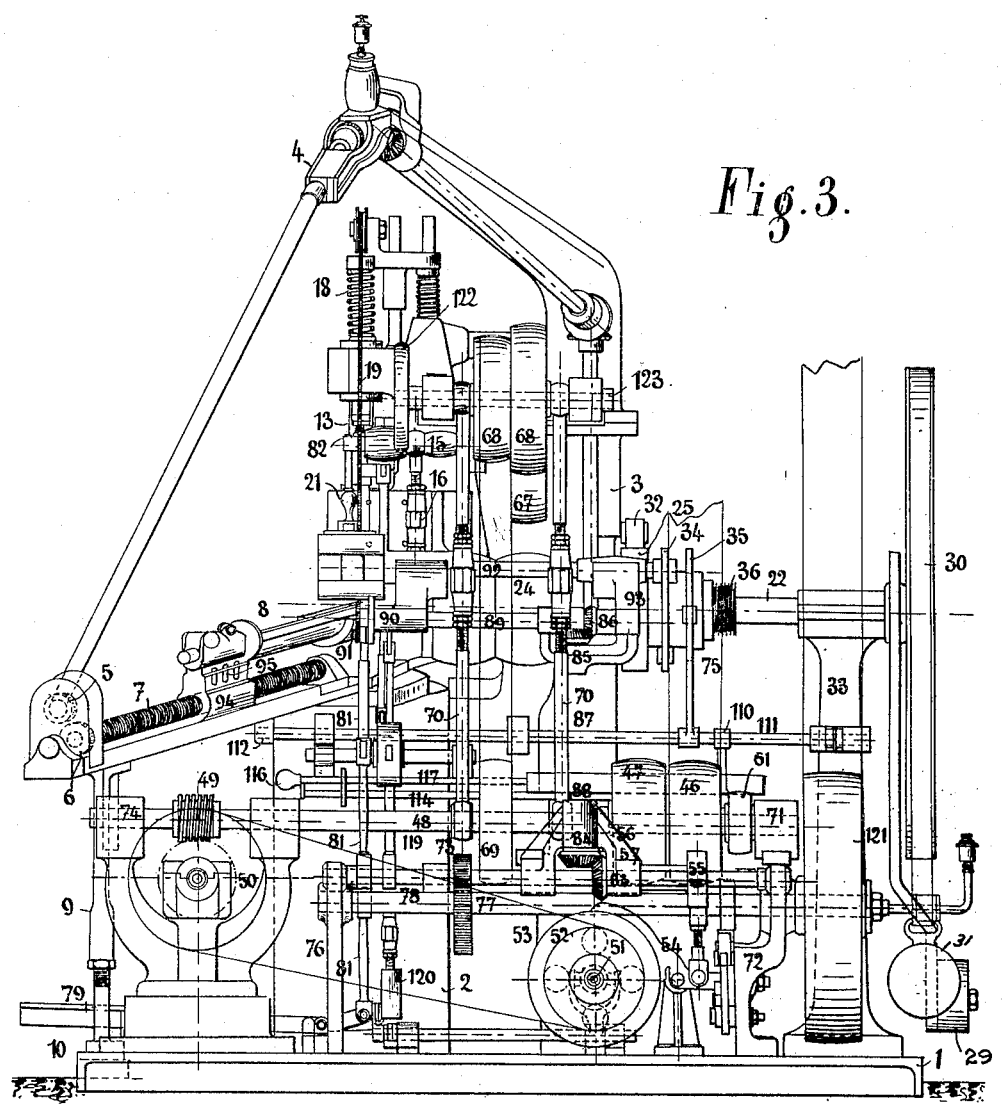
Figure 3 is a side elevation of the machine.

19 is a chain which compresses the springs 18 to a greater or less extent, and by means of which the weight of the blow of the hammer can be varied. This chain is controlled by a non-reversible worm 20 which is also exposed to the action of the cutting template 34 and of the handle 21 which is within reach of the attendant's hand. The cutting template 34 acts on the spindle 92 for tightening the chain by means of the lever 93 (Figure 3).

The parts constituting the movable head 23 and carrying the chisel 11, are adapted to swing about the shaft 22 on which they are mounted, in order to enable the chisel to strike the file at a certain angle according to the shape of tooth to be obtained. This head 23 is mounted on a cast iron sleeve which in its turn is held in a casing 24 (see Figure 3) which is placed by the side of the block 2, and the whole is secured to the foundation plate.

According to the type of file to be cut, the said head 23 controlled by the so-called cutting template 25, can swing to a given extent which is adjusted by the template, thus rendering possible, as already stated, a certain inclination of the chisel. The inclination of the said head is adjustable by means of levers 26 connected together by a spindle 27 which operates a link 28 which produces the desired inclination of the head 23.

Figure 4:
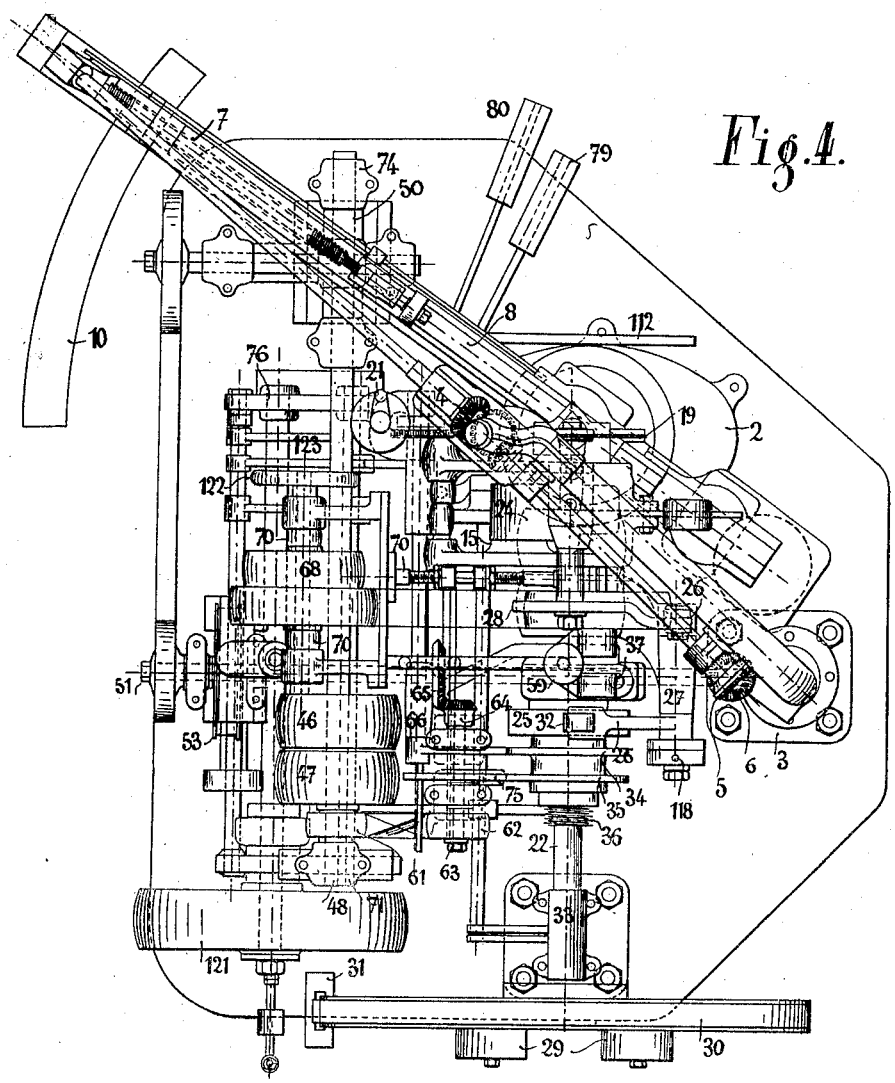
Figure 4 is a plan.

The oscillating head 23 is balanced by a weight 29 secured to the shaft 22 on which is mounted a wooden pulley 30 (see Figures 3 and 4) which has a second balance weight 31 which always tends to keep the roller 32 of the lever 26 in contact with the head template 25; the shaft 22 is supported at one of its ends on a column 33.

Figure 2:
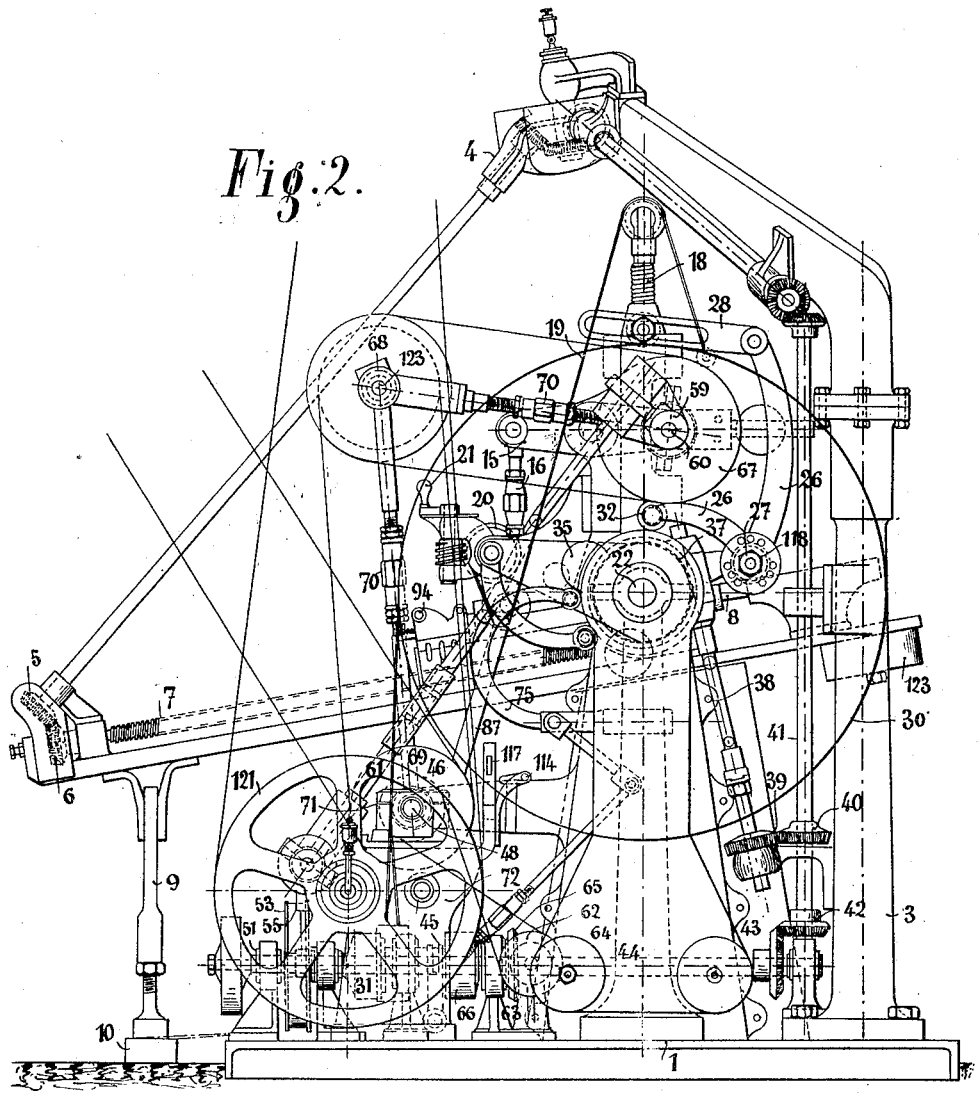
Figure 2 is a similar view of the back of the machine.

The templates for regulating the operation of the machine and designed to suit the shape of the files to be cut, are three; the head template 25, the cutting template 34 and the automatic motion template 35 (see Figures 3, 4, 13, 14 and 15). These templates, the shapes of which are shown in the accompanying drawings and which vary to a considerable extent according to the dimensions and shape of the files, are mounted on a cast iron sleeve 36 (Figures 3 and 16) mounted on the shaft 22 and controlled by a worm 37 (Figure 2) which receives its motion from a Cardan shaft 38 driven in its turn by a pinion 39 meshing with a pinion 40 mounted on the shaft 41 which is driven by pinions 42, 43 driven by a shaft 44 driven by a friction gear 45.

The general movement is imparted to the machine by the fast and loose pulleys 46 and 47 keyed to a shaft 48 which drives a worm 49 in mesh with a worm wheel 50 which drives the friction gears 45 in the rising direction of the carriage.

51 is the shaft on which is mounted the pulley 52 which is driven by the worm wheel 50. On the said shaft 51 is mounted the brake drum 53, the object of which is to allow of an automatic stopping of the advance of the carriage during the cutting at each contact of the chisel with the file. This stoppage is brought about by means of a block 54 controlled by an eccentric 55 which in its turn is driven by two bevel pinions 56, 57 in contact with the Cardan shaft with guide 58. This Cardan shaft is driven by two toothed wheels 59, one of which is keyed direct to the cam shaft 60.

To facilitate the return during a fresh cutting of a file, the mechanism is as follows: To the driving shaft 48 is keyed a pulley 61 which drives by means of a crossed belt a pulley 62 driving the shaft 63 to which is keyed the pinion 64 which, being in mesh with the pinion 65, rotates a friction cone 66 in a direction opposite to that of the shaft 51, thus rendering possible quick return of the carriage.

The cam 14 controlling the hammer 13, is mounted on a shaft 60 driven by a pulley 67 driven by another two-step pulley 68 which in its turn is rotated by a pulley 69 keyed to the shaft 48.

Turnbuckles 70 connect together the spindles of the pulleys 67, 68, 69, so as to avoid any wrong tension of the belts during the swinging of the head.

The shaft 48 is mounted at one of its ends in a bearing 71 which rests on the frame 72 of the automatic motion, in the centre in the bearing 73, and at the other end in bearings 74 which are secured to a frame stretching the belts. On the frame 72 is secured an automatic control device by means of rollers, the object of which is to allow the chain to be loosened, the guide and the hammer to be raised, these three movements being brought about by the lever 75 controlled by the template 35. The frame 76 connects together the shafts 77 and 78 controlling the levers for the three above mentioned movements.

The pedal 80 controls a device for stopping, during the running of the machine, the reciprocating movement of the carriage, so as to enable the attendant to change the chisel during the working. For this operation, the pedal 79 is utilized for raising the hammer by means of the levers 81 and of the counter-spring 82. In these operations, the loosening of the chain is obtained by means of the pinions 83, 84 which drive the pinions 85, 86 by means of a spindle 87 sliding in the guide 88. The pinion 86 drives the spindle 89 which in its turn drives a disc 90 to which is secured a roller 91 which, by its movement of rotation, loosens the chain.

The driver 94 (Figures 7–9) of the carriage 8 forms a connection between the worm 7 and the carriage, and is adjustable to suit the form of the blanks, by means of guides 95 and nuts 96. With this driver finer cutting is also obtained at the point, by means of the roller 97, and regulation is effected by the template 98 on which the roller runs.

The guide 17 (see Figures 10 and 11) is in one piece with the square section rod which slides in the head parallel to the hammer, this guide is controlled by a quadrant and a worm, clearly shown in the drawing, which enables this guide to be placed exactly parallel to, and in the same plane as, the cutting edge of the chisel.

The automatic movement by a pawl, shown in detail in Figure 12, is mounted on and keyed to the shaft 77, and comprises a box with rollers provided with a projection 99 in contact with a corresponding projection or finger 100 secured to the end of a lever 101 pivoted about a pin 102 and controlled by a lever 103 having a projection 104 of a shape which enables it to slide and disappear under the pressure of a finger 105 arranged at the end of a lever 106 pivoted about a pin 107, this lever 106 has a spring 108 secured to the same and always tending to return the lever 106, and therefore the finger 105, to the raised position, any misses in this movement thus being avoided.

109 is a connecting rod which keeps in position the lever 103. The rod 110 is connected by a spindle 111 to the lever 75 which controls this movement.

112 is a lever forming a balance weight and intended to release the pawl of Figure 12 on being operated by hand or by the knee.

113 is a hand wheel controlling the spindle 114 operating the connecting rod 115 and also adapted to be released by hand.

116 is a handle secured to the disengaging gear 117 for the purpose of completely stopping the machine.

118 is a part for regulating the variable inclination of the head (see Figure 2), comprising nine holes and by introducing suitable pins into these holes, it is possible to keep the said head in three different positions according to the kind of cutting required.

119 is a lever controlling all the levers operating the guide.

120 is the moderating device controlled by the pedal 80.

121 is a fly wheel controlling the automatic movement, it is driven by a countershaft not shown in the drawing.

122 is a fly wheel for regulating the height of striking, it is secured to the spindle 123 which in its turn is driven by the pulleys 68.

Figure 1:
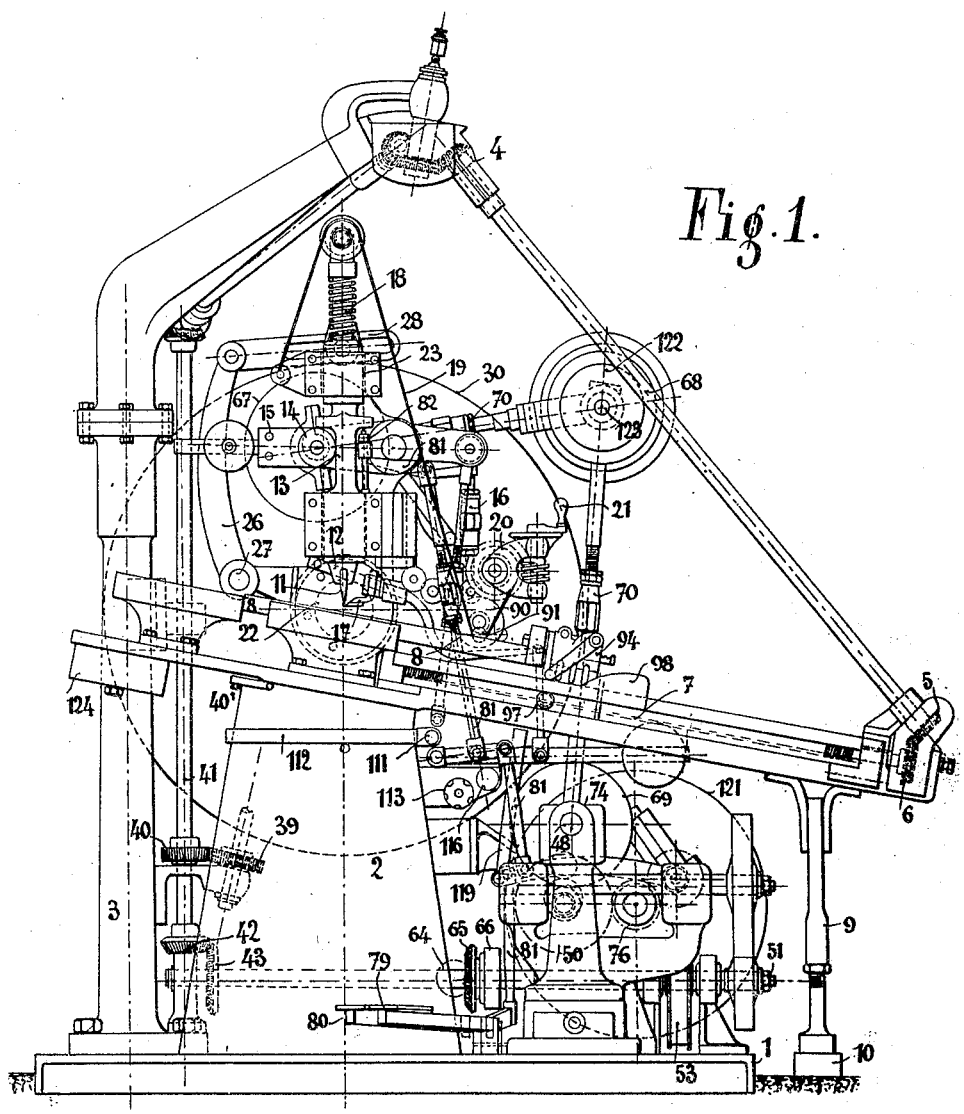
Figure 1 is an elevation of the machine from the side of the attendant.

The operation of the machine is as follows:

The attendant being seated in front of the machine in the position shown in Figure 1, can observe the working of the chisel, and the formation of the tooth in every direction, he has on his left, within reach of his hand, the stock of blanks to be cut. The carriage 8 has been previously provided with a bed of special metal of variable shape to suit the shape of the files to be cut, so that it does, or does not, leave, according to the said shapes, a longitudinal play for obtaining certain cuts. The templates correspond to the length and shape of the file to be cut, and having been put in place on the spindle 22, the attendant places the file to be cut on its bed, pushes the lever 116, and the machine starts.

The various templates being in contact with the roller 32 and the levers 93 and 75, transmit the movement corresponding to the said cut, to the gear wheels 4 and to the whole of the automatic motion. The chisel 11 drops under the action of the hammer 13 and of the cam 14, whilst the carriage 8 advances continuously, being driven in the manner hereinbefore described. During the said advance, the attendant has only to watch the cutting which he can regulate or improve as regards the force of blows, if he considers it advisable, by means of the handle 21 controlling the tightening of the chain 19 which, as already stated, regulates the action of the spring pressing on the hammer.

During the rise of the carriage, the latter is stopped automatically and synchronously with the chisel blow, by means of the brake block 54 controlled by the worm wheels 59 in direct contact with the cam shaft 60.

When the chisel has come to the end of the part being cut, the template 35 operates the lever 75 and transmits to the lever 110 (Figure 12) a release movement which raises the counter-spring 81, the chisel 11 and the guide 17 by means of the lever 119 controlling the levers operating the guide. At that moment the carriage redescends, and at the same time the attendant removes the cut file and replaces it on the bed by a new file blank, at the same time the chain 19 compressing the spring, is loosened automatically by the roller 91 (Figure 1) releasing the spring and facilitating the rise of the hammer and of the chisel. The template 35 operating the lever 75 which controls the lever 110, gives a fresh movement to the pawl or release device which again raises the carriage, stretches the chain 19 again and lowers into position the guide and the chisel, and the cutting operation described in the foregoing, begins again, without the attendant having made any other movements than those for removing and replacing the cut file.

During the cutting operation which must be regulated in order to obtain, as in hand working, a good shape of tooth, the position of the chisel relatively to the file must be varied, and this is obtained in the present machine exclusively by the action of one of the templates, without any intervention of the attendant, the whole of the head carrying the hammer and the chisel being inclined to the desired extent. This inclination is obtained automatically owing to the shape given to the template 25 which acts on the roller 32 controlling the lever 26 and the link 28, as already stated. The result is thus obtained, and the head returns to the normal position as soon as the template prescribes it.

The force of blow of the hammer can be regulated by means of the spring 18 more or less compressed by the lever 93 controlled by the cutting template 34 which in its turn is controlled by the shaft 92 (see Figure 3).

During the cutting, the attendant can, as already stated, correct the insufficient or excessive force of hammer blows by regulating by hand the handle 21 which loosens or tightens the chain.

The pedals 79 and 80 are used by the attendant for the following operations: The pedal 79 enables him to release the file from the chisel blow when he considers it advisable. The pedal 80 enables him to stop the rising of the carriage without stopping the general movement of the machine, by means of the moderating device 120.

The attendant can also stop completely the whole of the machine by pulling towards himself the button 116, which results in moving the belt from the fast to the loose pulley.

In order to vary the angle of cutting of the teeth, required by various types of files, the chisel always remaining in the axis of the machine, the carriage 8 is turned about the block as an axis, the said carriage sliding on the rolling track 10 balanced by the balance weight 124 and locked in position by the nut 40.

If during the working the attendant wishes to change the direction of running of the carriage, he can do it either by means of the lever 112 which he can operate simply with his knee, or by means of the hand wheel 113.

This machine may also be used for pricking rasps, in which case the chisel is replaced by a punch.

This machine may be built with left or right hand frame, so as to enable certain cuts to be obtained.

What I claim as my invention and desire to secure by Letters Patent is:—

1. A file-cutting machine comprising the combination of a hammer, a block receiving blows from the hammer, a foundation plate supporting the block and a column for carrying said mechanism with a cradle, a carriage reciprocating therein and receiving the file to be cut, a straight-edged-chisel for producing the cutting of the file, a cam causing the hammer to strike the chisel which is adapted to be inclined during the cutting, a template for controlling the main drive of the carriage, a template for controlling the inclination of the chisel and a template for controlling the strength of the blow, these templates being automatic in action and having a shape prescribed by the kind of file to be cut.

2. A file-cutting machine comprising the combination of a hammer, a block receiving blows from the hammer, a foundation plate supporting the block and a column for carrying said mechanism with a cradle, a carriage reciprocating therein and receiving the file to be cut, a worm, two satellite pinions for driving said worm for feeding said carriage, a straight-edged chisel for producing the cutting of the file, a cam causing the hammer to strike the chisel which is adapted to be inclined during the cutting, a template for controlling the main drive of the carriage, a template for controlling the inclination of the chisel and a template for controlling the strength of the blow, these templates being automatic in action and having a shape prescribed by the kind of file to be cut.

3. A file-cutting machine comprising the combination of a hammer, a block receiving blows from the hammer, a foundation plate supporting the block and a column for carrying said mechanism with a cradle, a carriage reciprocating therein and receiving the file to be cut, a worm, two satellite pinions for driving said worm for feeding said carriage, an adjustable track or ramp (98), a roller rising thereon for adjusting the height of the carriage to enable a finer cut to be made, a straight-edged chisel for producing the cutting of the file, a cam causing the hammer to strike the chisel which is adapted to be inclined during the cutting, a template for controlling the main drive of the carriage, a template for controlling the inclination of the chisel and a template for controlling the strength of the blow, these templates being automatic in action and having a shape prescribed by the kind of file to be cut.

4. A file-cutting machine comprising the combination of a hammer, a block receiving blows from the hammer, a foundation plate supporting the block and a column for carrying said mechanism with a cradle, a carriage receiving the file to be cut, a straight-edged chisel for producing the cutting of the file, a cam causing the hammer to strike the chisel which is adapted to be inclined during the cutting, a hand-operated tension device (20, 21), a chain acted upon by the tension device, a template for controlling the main drive of the carriage, a template for controlling the inclination of the chisel and a template for controlling the strength of the blow, these templates being automatic in action and having a shape prescribed by the kind of file to be cut.

5. A file-cutting machine comprising the combination of a hammer, a block receiving blows from the hammer, a foundation plate supporting the block and a column for carrying said mechanism with a cradle, a carriage reciprocating therein and receiving the file to be cut, a straight-edged chisel for producing the cutting of the file, a cam causing the hammer to strike the chisel which is adapted to be inclined during the cutting, a template for controlling the main drive of the carriage, a template for controlling the inclination of the chisel, a template for controlling the strength of the blow, these templates being automatic in action and having a shape prescribed by the kind of file to be cut, a movable head (23) on which the hammer and chisel are carried, a disk (118) for regulating the inclination of the hammer and chisel and a number of pins engaging with holes in said disc.

6. A file-cutting machine comprising the combination of a hammer, a block receiving blows from the hammer, a foundation plate supporting the block and a column for carrying said mechanism with a cradle, a carriage reciprocating therein and receiving the file to be cut, a straight-edged chisel for producing the cutting of the file, a cam causing the hammer to strike the chisel which is adapted to be inclined during the cutting, a template for controlling the main drive of the carriage, a template for controlling the inclination of the chisel, a template for controlling the strength of the blow, these templates being automatic in action and having a shape prescribed by the kind of file to be cut, a free wheel device controlled by one of said templates, and clutches for reversing the carriage by means of the free wheel device.

7. A file-cutting machine comprising the combination of a hammer, a block receiving blows from the hammer, a foundation plate supporting the block and a column for carrying said mechanism with a cradle, a carriage reciprocating therein and receiving the file to be cut, a straight-edged chisel for producing the cutting of the file, a cam causing the hammer to strike the chisel which is adapted to be inclined during the cutting, a template for controlling the main drive of the carriage, a template for controlling the inclination of the chisel, a template for controlling the strength of the blow, these templates being automatic in action and having a shape prescribed by the kind of file to be cut, a free wheel device controlled by one of said templates, clutches for reversing the carriage by means of the free wheel device, and a brake device for delaying the carriage.

8. A file-cutting machine comprising the combination of a hammer, a block receiving blows from the hammer, a foundation plate supporting the block and a column for carrying said mechanism with a cradle, a carriage reciprocating therein, and receiving the file to be cut, a straight-edged chisel for producing the cutting of the file, a cam causing the hammer to strike the chisel which is adapted to be inclined during the cutting, a template for controlling the main drive of the carriage, a template for controlling the inclination of the chisel, a template for controlling the strength of the blow, these templates being automatic in action and having a shape prescribed by the kind of file to be cut, a worm gear and a guide (17) adjustable thereby and adapted to be raised conjointly with the hammer.

9. A file-cutting machine comprising the combination of a hammer, a block receiving blows from the hammer, a foundation plate supporting the block and a column for carrying said mechanism with a cradle, a carriage reciprocating therein and receiving the file to be cut, a straight-edged chisel for producing the cutting of the file, a cam causing the hammer to strike the chisel which is adapted to be inclined during the cutting, a template for controlling the main drive of the carriage, a template for controlling the inclination of the chisel, a template for controlling the strength of the blow, these templates being automatic in action and having a shape prescribed by the kind of file to be cut and a rolling track (10) and a balance weight (124) for changing the position of the carriage and its driving device relatively to the base.

10. A file-cutting machine with a foundation plate, a solid base carried thereby, a chisel, a chisel holder for the chisel oscillating in a vertical plane, a blank, a carriage reciprocated automatically adapted to receive the blank, a rotatable sleeve, a shaft rotatably mounted therein, driving gear for the chisel holder, a movable head containing the chisel holder with the driving gear mounted on the shaft, a template for controlling the inclination of the chisel, a template for controlling the main drive of the carriage, a template for controlling the strength of the blow, these templates being carried by the rotatable sleeve, and counterweights which exercise a permanent traction on the chisel holder.

In testimony whereof I have signed my name to this specification in the presence of two subscribing witnesses.

HENRI DURLACH.

Witnesses:
  GEORGES FAUGIN,
  ROGER RAGUET.